(12) United States Patent
Mount et al.

(10) Patent No.: US 9,497,501 B2
(45) Date of Patent: Nov. 15, 2016

(54) AUGMENTED REALITY VIRTUAL MONITOR

(75) Inventors: Brian Mount, Seattle, WA (US);
Stephen Latta, Seattle, WA (US);
Adam Poulos, Redmond, WA (US);
Daniel McCulloch, Kirkland, WA (US);
Darren Bennett, Seattle, WA (US);
Ryan Hastings, Seattle, WA (US);
Jason Scott, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 134 days.

(21) Appl. No.: 13/312,604

(22) Filed: Dec. 6, 2011

(65) Prior Publication Data

US 2013/0141421 A1    Jun. 6, 2013

(51) Int. Cl.
| | |
|---|---|
| *H04N 21/81* | (2011.01) |
| *H04N 21/414* | (2011.01) |
| *H04N 13/00* | (2006.01) |
| *H04N 13/02* | (2006.01) |
| *H04N 13/04* | (2006.01) |
| *G02B 27/01* | (2006.01) |
| *H04N 21/4223* | (2011.01) |

(52) U.S. Cl.
CPC ...... *H04N 21/41407* (2013.01); *G02B 27/017* (2013.01); *H04N 13/004* (2013.01); *H04N 13/0278* (2013.01); *H04N 13/044* (2013.01); *H04N 21/41415* (2013.01); *H04N 21/4223* (2013.01); *G02B 2027/014* (2013.01); *G02B 2027/0138* (2013.01); *G02B 2027/0178* (2013.01); *G02B 2027/0187* (2013.01); *H04N 21/816* (2013.01); *H04N 21/8146* (2013.01)

(58) Field of Classification Search
None
See application file for complete search history.

(56) References Cited

U.S. PATENT DOCUMENTS

| | | | |
|---|---|---|---|
| 4,461,541 | A | 7/1984 | Duthie |
| 4,562,463 | A | 12/1985 | Lipton |
| 4,740,836 | A | 4/1988 | Craig |
| 4,933,755 | A | 6/1990 | Dahl et al. |
| 5,129,716 | A | 7/1992 | Holakovszky et al. |
| 5,365,370 | A | 11/1994 | Hudgins |

(Continued)

FOREIGN PATENT DOCUMENTS

| | | |
|---|---|---|
| CN | 1262743 A | 8/2000 |
| JP | 11202256 A | 7/1999 |

(Continued)

OTHER PUBLICATIONS

Kato, Hirokazu, and Mark Billinghurst. "Marker tracking and hmd calibration for a video-based augmented reality conferencing system." Augmented Reality, 1999.(IWAR'99) Proceedings. 2nd IEEE and ACM International Workshop on. IEEE, 1999, pp. 85-94.*

(Continued)

*Primary Examiner* — Xiao Wu
*Assistant Examiner* — Steven Elbinger
(74) *Attorney, Agent, or Firm* — Dan Choi; Micky Minhas (57) ABSTRACT

A head-mounted display includes a see-through display and a virtual reality engine. The see-through display is configured to visually augment an appearance of a physical space to a user viewing the physical space through the see-through display. The virtual reality engine is configured to cause the see-through display to visually present a virtual monitor that appears to be integrated with the physical space to a user viewing the physical space through the see-through display.

20 Claims, 3 Drawing Sheets

(56) References Cited

U.S. PATENT DOCUMENTS

| | | | |
|---|---|---|---|
| 5,835,133 | A | 11/1998 | Moreton et al. |
| 6,127,990 | A * | 10/2000 | Zwern ............................ 345/8 |
| 6,222,465 | B1 | 4/2001 | Kumar et al. |
| 6,396,497 | B1 * | 5/2002 | Reichlen ...................... 345/427 |
| 7,038,698 | B1 | 5/2006 | Palm et al. |
| 2002/0158873 | A1 | 10/2002 | Williamson |
| 2003/0032484 | A1 * | 2/2003 | Ohshima et al. ............... 463/43 |
| 2004/0070611 | A1 | 4/2004 | Tanaka et al. |
| 2007/0013716 | A1 * | 1/2007 | Kjeldsen et al. ............. 345/594 |
| 2007/0291035 | A1 | 12/2007 | Vesely et al. |
| 2008/0024594 | A1 | 1/2008 | Ritchey |
| 2008/0246759 | A1 | 10/2008 | Summers |
| 2009/0128564 | A1 | 5/2009 | Okuno |
| 2009/0189974 | A1 * | 7/2009 | Deering .................. G09G 3/02 348/46 |
| 2010/0020254 | A1 | 1/2010 | Geng |
| 2010/0110069 | A1 | 5/2010 | Yuan |
| 2010/0156787 | A1 | 6/2010 | Katayama |
| 2010/0208033 | A1 * | 8/2010 | Edge et al. ..................... 348/46 |
| 2010/0287485 | A1 * | 11/2010 | Bertolami et al. ............ 715/764 |
| 2010/0321482 | A1 | 12/2010 | Cleveland |
| 2011/0018903 | A1 * | 1/2011 | Lapstun et al. ............... 345/633 |
| 2011/0128300 | A1 * | 6/2011 | Gay et al. ..................... 345/633 |
| 2011/0141113 | A1 * | 6/2011 | Feth et al. .................... 345/427 |
| 2011/0210962 | A1 * | 9/2011 | Horan et al. .................. 345/419 |
| 2011/0216002 | A1 * | 9/2011 | Weising et al. ............... 345/158 |
| 2011/0216060 | A1 | 9/2011 | Weising et al. |
| 2011/0239136 | A1 * | 9/2011 | Goldman et al. ............. 715/757 |
| 2012/0154447 | A1 * | 6/2012 | Kim et al. .................... 345/661 |
| 2012/0192088 | A1 * | 7/2012 | Sauriol et al. ................ 715/757 |
| 2014/0313295 | A1 | 10/2014 | Dolim et al. |

FOREIGN PATENT DOCUMENTS

| | | | |
|---|---|---|---|
| JP | 2009538487 | A | 11/2009 |
| KR | 20090047889 | A | 5/2009 |
| WO | 9854602 | A2 | 12/1998 |
| WO | 2009155688 | A1 | 12/2009 |

OTHER PUBLICATIONS

Kato, et al. "Marker Tracking and HMD Calibration for a Video-based Augmented Reality Conferencing System", Retrieved at <<http://cgit.nutn.edu.tw:8080/cgit/PaperDL/CUC_1107081535-03.PDF>>, Proceedings of the 2nd IEEE and ACM International Workshop on Augmented Reality, Oct. 20-21, 1999, pp. 10.

Becker, Allen., "Modern Virtual Screen Technology and Applications", Retrieved at <<http://ieeexplore.ieee.org/stamp/stamp.jsp?tp=&arnumber=63749>>, Thirty-Fifth IEEE Computer Society International Conference Compcon Spring, Intellectual Leverage. Digest of Papers, Feb. 26-Mar. 2, 1990, pp. 612-615.

"International Search Report", Mailed Date: Mar. 15, 2013, Application No. PCT/US2012/067643, Filed Date: Dec. 3, 2012, pp. 9.

State Intellectual Property Office of the People's Republic of China, First Office Action Issued in Chinese Patent Application No. 201210516323.7, Aug. 22, 2014, 19 Pages.

Gateau, S. et al., "Implementing Stereoscopic 3D in Your Applications," GPU Technology Conference, Available Online at http://www.nvidia.com/content/gtc-2010/pdfs/2010_gtc2010.pdf, Sep. 20, 2010, 76 pages.

"Definiti 3D Stereo Theaters + Definiti 3D Stereo Projection for Full Dome—Data Sheet," Available Online at https://www.skyskan.com/files/documents/definiti_3d-sky-skan_data_sheet_print.pdf, Available as Early as Jun. 20, 2012, 18 pages.

NVIDIA, "Practical 3D Vision in Games—Principle, Implementation and Optimization," Available Online at https://developer.nvidia.com/sites/default/files/akamai/gameworks/CN/3dvision_cgdc_en.pdf, Available as Early as May 23, 2014, 65 pages.

Hoffman, Craig Lee et al., "Stereoscopic Image Display," U.S. Appl. No. 14/318,451, filed Jun. 27, 2014, 52 pages.

Daly, L., "3D Google Cardboard," Leonard Daly's Blog—Daly Realism—Creating the Future, Available Online at http://realism.com/blog/3d-google-cardboard, Nov. 18, 2014, 5 pages.

Oculus, "Best Practices Guide," Available Online at http://static.oculus.com/sdk-downloads/documents/Oculus_Best_Practices_Guide.pdf, Jan. 9, 2015, 54 pages.

Oculus, "Oculus Rift Developer Guide," Available Online at http://static.oculus.com/sdk-downloads/documents/Oculus_Developer_Guide_0.5.0.pdf, Available as Early as Apr. 7, 2015, 49 pages.

The State Intellectual Property Office of China, Second Office Action issued in China Patent Application No. 201210516323.7, Apr. 10, 2015, China, 6 Pages.

ISA European Patent Office, International Search Report and Written Opinion issued in PCT Application No. PCT/US2016/036539, Aug. 19, 2016, WIPO, 13 pages.

* cited by examiner

AUGMENTED REALITY VIRTUAL MONITOR

BACKGROUND

Televisions, computer displays, movie screens, and other video monitors provide visual information to users. A conventional video monitor is limited by a variety of different physical constraints, such as the physical size of the monitor and the physical locations at which the monitor may be positioned.

SUMMARY

A head-mounted display includes a see-through display and a virtual reality engine. The see-through display is configured to visually augment an appearance of a physical space to a user viewing the physical space through the see-through display. The virtual reality engine is configured to cause the see-through display to visually present a virtual monitor that appears to be integrated with the physical space to a user viewing the physical space through the see-through display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
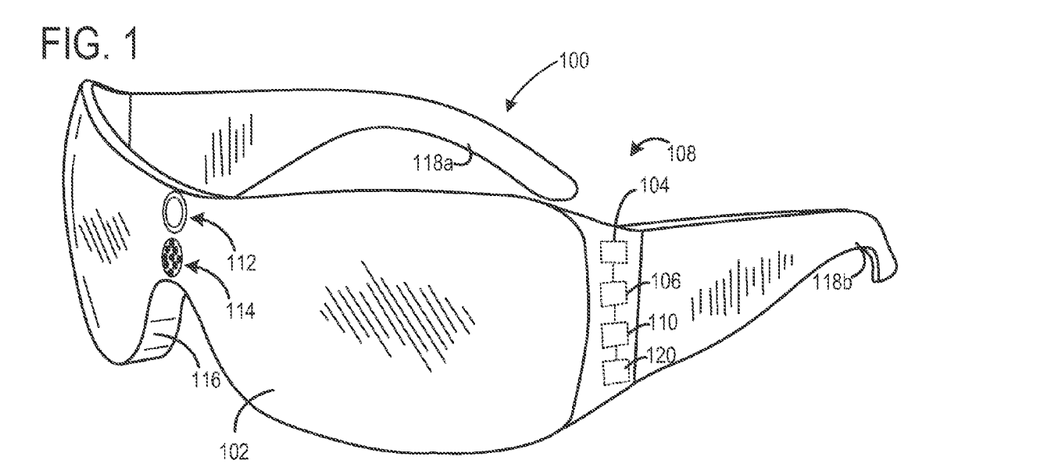
FIG. 1 shows an example head-mounted display in accordance with an embodiment of the present disclosure.

FIG. 1 shows a nonlimiting example of a head-mounted display 100 including a see-through display 102. See-through display 102 is at least partially transparent, thus allowing light to pass through the see-through display to the eyes of a user. Furthermore, the see-through display is configured to visually augment an appearance of a physical space to a user viewing the physical space through the see-through display. For example, the see-through display may display virtual objects that the user can see when the user looks through the see-through display. As such, the user is able to view the virtual objects that do not exist within the physical space at the same time that the user views the physical space. This creates the illusion that the virtual objects are part of the physical space.

Head-mounted display 100 also includes a virtual reality engine 104. The virtual reality engine 104 is configured to cause the see-through display to visually present a virtual object in the form of a virtual monitor. The virtual monitor can simulate the appearance of a real world television, computer display, movie screen, and/or other monitor. To a user viewing the physical space through the see-through display, the virtual monitor appears to be integrated with the physical space. In this way, the user is able to view a monitor that is not actually present in the physical space. Virtual reality engine may include software, hardware, firmware, or any combination thereof.

Figure 2A:
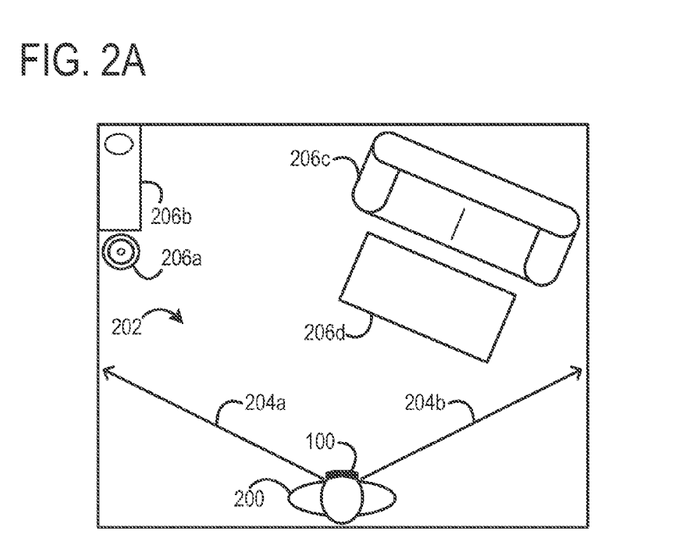
FIG. 2A shows a top view of a user wearing a head-mounted display in a physical space.

FIG. 2A schematically shows a top view of user 200 wearing head-mounted display 100 within a physical space 202. Lines 204a and 204b indicate the field of view of the user through the see-through display of the head-mounted display. FIG. 2A also shows the real world objects 206a, 206b, 206c, and 206d within physical space 202 that are in the field of view of the user 200.

Figure 2B:
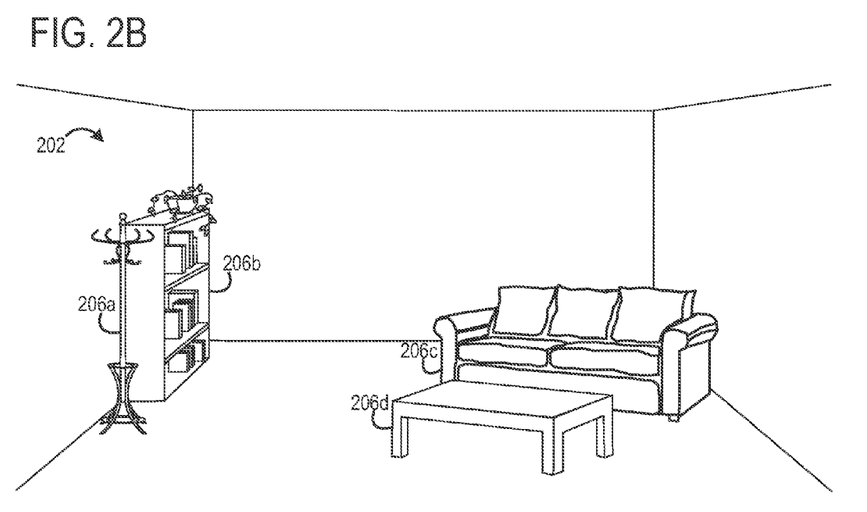
FIG. 2B shows an unaltered first-person perspective of the user of FIG. 2A.

FIG. 2B shows a first-person perspective of the user 200 viewing real world objects 206a, 206b, 206c, and 206d through the head-mounted display. In FIG. 2B, the virtual reality engine of the head-mounted display is not visually presenting virtual objects. As such, the user is only able to see the real world objects. The user sees such real world objects because light reflecting from the real world objects is able to pass through the see-through display to the eyes of the user.

Figure 2C:
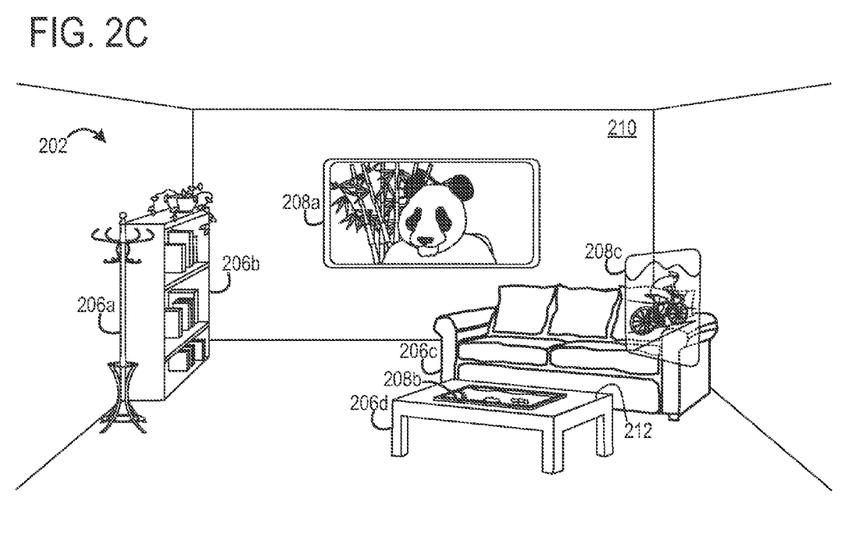
FIG. 2C shows a first-person perspective of the user of FIG. 2A while the head-mounted display augments reality to visually present virtual monitors.

FIG. 2C shows the same first-person perspective of the user 200 but with the virtual reality engine visually presenting virtual objects. In particular, the virtual reality engine is visually presenting a virtual monitor 208a, a virtual monitor 208b, and virtual monitor 208c. From the perspective of the user, the virtual monitors appear to be integrated with the physical space 202.

In particular, FIG. 2C shows virtual monitor 208a rendered to appear as if the virtual monitor is mounted to a wall 210—a typical mounting option for conventional televisions. Virtual monitor 208b is rendered to appear as if the virtual monitor is resting on table surface 212—a typical usage for conventional tablet computing devices. Virtual monitor 208c is rendered to appear as if floating in free space—an arrangement that is not easily achieved with conventional monitors.

Virtual monitor 208a, virtual monitor 208b, and virtual monitor 208c are provided as nonlimiting examples. A virtual monitor may be rendered to have virtually any appearance without departing from the scope of this disclosure.

As one example, a virtual monitor may be playing a video stream of moving or static images. A video stream of moving images may be played at a relatively high frame rate so as to create the illusion of live action. As a nonlimiting example, a video stream of a television program may be played at thirty frames per second. A video stream of static images may present the same image on the virtual monitor for a relatively longer period of time. As a nonlimiting example, a video stream of a photo slideshow may only change images every five seconds. It is to be understood that virtually any frame rate may be used without departing from the scope of this disclosure.

As another example, a virtual monitor may be opaque (e.g., virtual monitor 208a and virtual monitor 208b) or partially transparent (e.g., virtual monitor 208c). An opaque virtual monitor may be rendered so as to occlude real world objects that appear to be behind the virtual monitor. A partially transparent virtual monitor may be rendered so that real world objects or other virtual objects can be viewed through the virtual monitor.

As another example, a virtual monitor may be frameless (e.g., virtual monitor 208c) or framed (e.g., virtual monitor 208a and virtual monitor 208b). A frameless virtual monitor may be rendered with an edge-to-edge screen portion that can play a video stream without any other structure rendered around the screen portion. In contrast, a framed virtual monitor may be rendered to include a frame around the screen. Such a frame may be rendered so as to resemble the appearance of a conventional television frame, computer display frame, movie screen frame, or the like.

Both frameless and framed virtual monitors may be rendered without any depth. For example, when viewed from an angle, a depthless virtual monitor will not appear to have any structure behind the surface of the screen (e.g., virtual monitor 208c). Furthermore, both frameless and framed virtual monitors may be rendered with a depth, such that when viewed from an angle the virtual monitor will appear to occupy space behind the surface of the screen (virtual monitor 208b).

As another example, a virtual monitor may include a rectangular or nonrectangular screen. Furthermore, the screen may be planar or non-planar. In some embodiments, the screen of a virtual monitor may be shaped to match the planar or non-planar shape of a real world object in a physical space (e.g., virtual monitor 208a and virtual monitor 208b) or to match the planar or non-planar shape of another virtual object. Even when a planar screen is rendered, the video stream rendered on the planar screen may be configured to display three-dimensional virtual objects (e.g., to create the illusion of watching a three-dimension television). Three-dimensional virtual objects may be accomplished via simulated stereoscopic 3D content—e.g. watching 3D content from a 3D recording so that content appears in 2D and on the plane of the display, but the user's left and right eyes see slightly different views of the video, producing a 3D effect. In some implementations, playback of content may cause virtual 3D objects to actually leave the plane of the display. For example, a movie where the menus actually pop out of the TV into the user's living room. Further, a frameless virtual monitor may be used to visually present three-dimensional virtual objects from the video stream, thus creating the illusion that the contents of the video stream are playing out in the physical space environment.

As another example, the virtual monitor may be rendered in a stationary location relative to real world objects in the physical space, or the virtual monitor may be rendered so as to move relative to real world objects. A stationary virtual monitor may appear to be fixed to a wall, table, or other surface, for example. A stationary virtual monitor may also appear to be floating apart from any real world objects.

A moving virtual monitor may appear to move in a constrained or unconstrained fashion. For example, a virtual monitor may be constrained to a physical wall, but the virtual monitor may move along the wall as a user walks by the wall. As another example, a virtual monitor may be constrained to a moving object. As yet another example, a virtual monitor may not be constrained to any physical objects and may appear to float directly in front of a user regardless of where the user looks.

A virtual monitor may be either a private virtual monitor or a public virtual monitor. A private virtual monitor is rendered on only one see-through display so only the user viewing the physical space through the see-through display sees the virtual monitor. A public virtual monitor may be concurrently rendered on one or more other devices, including other see-through displays, so that other people may view a clone of the virtual monitor.

In some embodiments, the virtual reality engine may be configured to map a virtual coordinate system to the physical space such that the virtual monitor appears to be at a particular physical-space location. Furthermore, the virtual coordinate system may be a shared coordinate system useable by one or more other head-mounted displays. In such a case, each separate head-mounted display may recognize the same physical space location where the virtual monitor is to appear. Each head-mounted display may then render the virtual monitor at that physical space location so that two or more users viewing the physical space location through different see-through displays will see the same virtual monitor in the same place and with the same orientation. In other words, the particular physical-space location at which one head-mounted display renders a virtual object will be the same physical-space location that another head-mounted display renders the virtual monitor.

Turning back to FIG. 1, head-mounted display 100 may optionally include one or more speakers 106—e.g., two speakers to enable stereo sound effects such as positional audio hints. In other embodiments, the head-mounted display may be communicatively coupled to an off-board speaker. In either case, the virtual reality engine may be configured to cause such a speaker to play an audio stream that is synced to a video stream played by a virtual monitor. For example, while virtual monitor 208a of FIG. 2C plays a video stream in the form of a television program, a speaker may play an audio stream that constitutes the audio component of the television program.

The volume of an audio stream may be modulated in accordance with a variety of different parameters. As one example, the rendering engine may be configured to modulate a volume of the audio stream inversely proportional to a distance between the see-through display and a physical-space location at which the virtual monitor appears to be located to a user viewing the physical space through the see-through display. In other words, sound can be localized so that as a user gets closer to the virtual monitor, the volume of the virtual monitor will increase. As another example, the rendering engine may be configured to modulate a volume of the audio stream in proportion to a directness that the see-through display is viewing a physical-space location at which the virtual monitor appears to be located to the user viewing the physical space through the see-through display. In other words, the volume increases as the user more directly looks at the virtual monitor.

When two or more virtual monitors are mapped to positions near a user, the respective audio streams associated with the virtual monitors may be mixed together or played independently. When mixed together, the relative contribution of any particular audio stream may be weighted based on a variety of different parameters, such as proximity or directness of view. For example, the closer a user is to a particular virtual monitor and/or the more directly the user looks at the virtual monitor, the louder the volume associated with that virtual monitor will be played.

When played independently, an audio stream associated with a particular virtual monitor may be played instead of the audio stream(s) associated with other virtual monitor(s) based on a variety of different parameters, such as proximity and/or directness of view. For example, as a user looks around a physical place in which several virtual monitors are rendered, only the audio stream associated with the virtual monitor that is most directly in the user's field of vision may be played. As discussed below, eye tracking may be used to more accurately assess where a user's focus is directed, and such focus may serve as a parameter for modulating volume.

Turning briefly to FIG. 1, head-mounted display 100 includes a sensor subsystem 108. The sensor subsystem may include a variety of different sensors in different embodiments. As nonlimiting examples, a sensor subsystem may include a microphone 110, one or more forward-facing (away from user) infrared and/or visible light cameras 112, one or more rearward-facing (towards user) infrared and/or visible light cameras 114. The forward-facing camera(s) may include one or more depth cameras, and/or the rearward-facing cameras may include one or more eye-tracking cameras. In some embodiments, an onboard sensor subsystem may communicate with one or more off-board sensors that send observation information to the onboard sensor subsystem. For example, a depth camera used by a gaming console may send depth maps and/or modeled virtual skeletons to the sensor subsystem of the head-mounted display.

The virtual reality engine may be configured to control a virtual monitor responsive to commands recognized via the sensor subsystem. As nonlimiting examples, commands recognized via the sensor subsystem may be used to control virtual monitor creation, virtual monitor positioning (e.g., where and how large virtual monitors appear); playback controls (e.g., which content is visually presented, fast forward, rewind, pause, etc.); volume of audio associated with virtual monitor; privacy settings (e.g., who is allowed to see clone virtual monitors; what such people are allowed to see); screen capture, sending, printing, and saving; and/or virtually any other aspect of a virtual monitor.

As introduced above, a sensor subsystem may include or be configured to communicate with one or more different types of sensors, and each different type of sensor may be used to recognize commands for controlling a virtual monitor. As nonlimiting examples, the virtual reality engine may be configured to control the virtual monitor responsive to audible commands recognized via a microphone, hand gesture commands recognized via a camera, and/or eye gesture commands recognized via a camera.

The types of commands and the way that such commands control the virtual monitors may vary without departing from the scope of this disclosure. To create a virtual monitor, for instance, a forward-facing camera may recognize a user framing a scene with an imaginary rectangle between a left hand in the shape of an L and a right hand in the shape of an L. When this painter's gesture with the L-shaped hands is made, a location and size of a new virtual monitor may be established by projecting a rectangle from the eyes of the user to the rectangle established by the painter's gesture, and on to a wall behind the painter's gesture.

As another example, the location and size of a new virtual monitor may be established by recognizing a user tapping a surface to establish the corners of a virtual monitor. As yet another example, a user may speak the command "new monitor," and a virtual monitor may be rendered on a surface towards which eye-tracking cameras determine a user is looking.

Once a virtual monitor is rendered and playing a video stream, a user may speak commands such as "pause," "fast forward," "change channel," etc. to control the video stream. As another example, the user may make a stop-sign hand gesture to pause playback, swipe a hand from left to right to fast forward, or twist an outstretched hand to change a channel. As yet another example, a user may speak "split" or make a karate chop gesture to split a single virtual monitor into two virtual monitors that may be moved to different physical space locations.

Returning briefly to FIG. 1, head-mounted display 100 may include one or more features that allow the head-mounted display to be worn on a user's head. In the illustrated example, head-mounted display 100 takes the form of eye glasses and includes a nose rest 116 and ear rests 118a and 118b. In other embodiments, a head-mounted display may include a hat or helmet with an in-front-of-the-face see-through visor. Furthermore, while described in the context of a head-mounted see-through display, the concepts described herein may be applied to see-through displays that are not head mounted (e.g., a windshield) and to displays that are not see-through (e.g., an opaque display that renders real objects observed by a camera with virtual objects not within the camera's field of view).

Head-mounted display 100 may also include a communication subsystem 120. Communication subsystem 120 may be configured to communicate with one or more off-board computing devices. As an example, the communication subsystem may be configured to wirelessly receive a video stream, audio stream, coordinate information, virtual object descriptions, and/or other information to render a virtual monitor.

Figure 3:
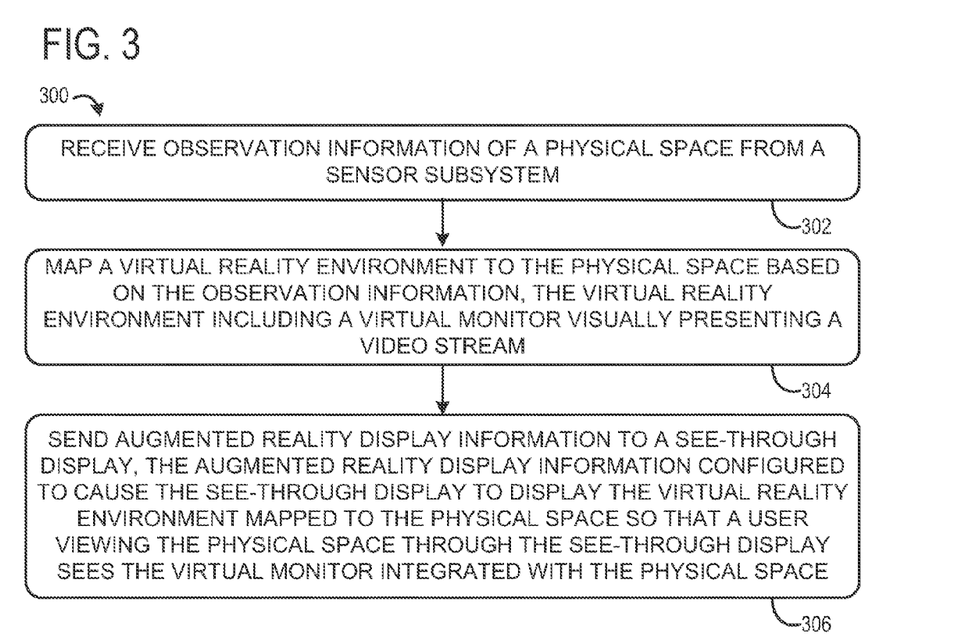
FIG. 3 is an example method of augmenting reality in accordance with an embodiment of the present disclosure.

FIG. 3 shows an example method 300 of augmenting reality. At 302, method 300 includes receiving observation information of a physical space from a sensor subsystem. The observation information may include any information describing the physical space. As nonlimiting examples, images from one or more cameras and/or audio information from one or more microphones may be received. The information may be received from sensors that are part of a head-mounted display and/or off-board sensors that are not part of a head-mounted display. The information may be received at a head-mounted display or at an off-board device that communicates with a head-mounted display.

At 304 method 300 includes mapping a virtual reality environment to the physical space based on the observation information, wherein the virtual reality environment includes a virtual monitor visually presenting a video stream. Such mapping may be performed by a virtual reality engine that is part of a head-mounted display or an off-board device that communicates with a head-mounted display.

At 306, method 300 includes sending augmented reality display information to a see-through display. The augmented reality display information is configured to cause the see-through display to display the virtual reality environment mapped to the physical space so that a user viewing the physical space through the see-through display sees the virtual monitor integrated with the physical space. The augmented reality display information may be sent to the see-through display from a virtual reality engine that is part of a head-mounted display or an off-board device that communicates with a head-mounted display.

In some embodiments, the above described augmented reality techniques may be tied to a computing system that is integrated into a head-mounted display and/or a computing system that is configured to communicate with a head-mounted display. In particular, the methods and processes described herein may be implemented as a computer application, computer service, computer API, computer library, and/or other computer program product.

Figure 4:
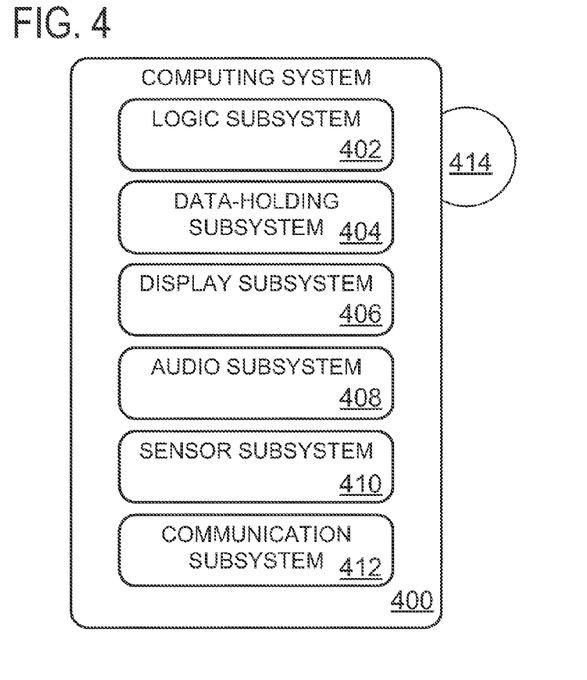
FIG. 4 is an example computing system in accordance with an embodiment of the present disclosure.

FIG. 4 schematically shows a nonlimiting computing system 400 that may perform one or more of the above described methods and processes. Computing system 400 is shown in simplified form. It is to be understood that virtually any computer architecture may be used without departing from the scope of this disclosure. In different embodiments, computing system 400 may take the form of an onboard head-mounted display computer, mainframe computer, server computer, desktop computer, laptop computer, tablet computer, home entertainment computer, network computing device, mobile computing device, mobile communication device, gaming device, etc.

Computing system 400 includes a logic subsystem 402 and a data-holding subsystem 404. Computing system 400 may optionally include a display subsystem 406, audio subsystem 408, sensor subsystem 410, communication subsystem 412, and/or other components not shown in FIG. 4.

Logic subsystem 402 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 404 may include one or more physical, non-transitory, devices configured to hold data and/or instructions executable by the logic subsystem to implement the herein described methods and processes. When such methods and processes are implemented, the state of data-holding subsystem 404 may be transformed (e.g., to hold different data).

Data-holding subsystem 404 may include removable media and/or built-in devices. Data-holding subsystem 404 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 404 may include devices with one or more of the following characteristics: volatile, nonvolatile, dynamic, static, read/write, read-only, random access, sequential access, location addressable, file addressable, and content addressable. In some embodiments, logic subsystem 402 and data-holding subsystem 404 may be integrated into one or more common devices, such as an application specific integrated circuit or a system on a chip.

FIG. 4 also shows an aspect of the data-holding subsystem in the form of removable computer-readable storage media 414, which may be used to store and/or transfer data and/or instructions executable to implement the herein described methods and processes. Removable computer-readable storage media 414 may take the form of CDs, DVDs, HD-DVDs, Blu-Ray Discs, EEPROMs, and/or floppy disks, among others.

It is to be appreciated that data-holding subsystem 404 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system 400 that is implemented to perform one or more particular functions. In some cases, such a module, program, or engine may be instantiated via logic subsystem 402 executing instructions held by data-holding subsystem 404. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

When included, display subsystem 406 may be used to present a visual representation of data held by data-holding subsystem 404. As the herein described methods and processes change the data held by the data-holding subsystem, and thus transform the state of the data-holding subsystem, the state of display subsystem 406 may likewise be transformed to visually represent changes in the underlying data. Display subsystem 406 may include one or more display devices utilizing virtually any type of technology. Such display devices may be combined with logic subsystem 402 and/or data-holding subsystem 404 in a shared enclosure (e.g., a head-mounted display with onboard computing), or such display devices may be peripheral display devices (a head-mounted display with off-board computing).

As one nonlimiting example, the display subsystem may include image-producing elements (e.g. see-through OLED displays) located within lenses of a head-mounted display. As another example, the display subsystem may include a light modulator on an edge of a lens, and the lens may serve as a light guide for delivering light from the light modulator to an eye of a user. In either case, because the lenses are at least partially transparent, light may pass through the lenses to the eyes of a user, thus allowing the user to see through the lenses.

Audio subsystem 408 may include or be configured to utilize one or more speakers for playing audio streams and/or other sounds as discussed above.

The sensor subsystem may include and/or be configured to communicate with a variety of different sensors. For example, the head-mounted display may include at least one inward facing sensor and/or at least one outward facing sensor. The inward facing sensor may be an eye tracking image sensor configured to acquire image data to allow a viewer's eyes to be tracked. The outward facing sensor may detect gesture-based user inputs. For example, an outwardly facing sensor may include a depth camera, a visible light camera, or another position tracking camera. Further, such outwardly facing cameras may have a stereo configuration. For example, the head-mounted display may include two depth cameras to observe the physical space in stereo from two different angles of the user's perspective. In some embodiments, gesture-based user inputs also may be detected via one or more off-board cameras.

Further, an outward facing image sensor may capture images of a physical space, which may be provided as input to an onboard or off-board 3D modeling system. A 3D modeling system may be used to generate a 3D model of the physical space. Such 3D modeling may be used to localize a precise position of a head-mounted display in a physical space so that virtual monitors may be rendered so as to appear in precise locations relative to the physical space. Furthermore, 3D modeling may be used to accurately identify real world surfaces to which virtual monitors can be constrained. To facilitate such 3D modeling, the sensor subsystem may optionally include an infrared projector to assist in structured light and/or time of flight depth analysis.

The sensor subsystem may also include one or more motion sensors to detect movements of a viewer's head when the viewer is wearing the head-mounted display. Motion sensors may output motion data for tracking viewer head motion and eye orientation, for example. As such, motion data may facilitate detection of tilts of the user's head along roll, pitch and/or yaw axes. Further, motion sensors may enable a position of the head-mounted display to be determined and/or refined. Likewise, motion sensors may also be employed as user input devices, such that a user may interact with the head-mounted display via gestures of the neck, head, or body. Non-limiting examples of motion sensors include an accelerometer, a gyroscope, a compass, and an orientation sensor. Further, the HMD device may be configured with global positioning system (GPS) capabilities.

The sensor subsystem may also include one or more microphones to allow the use of voice commands as user inputs.

When included, communication subsystem 412 may be configured to communicatively couple computing system 400 with one or more other computing devices. Communication subsystem 412 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 400 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A head-mounted display, comprising:
    a see-through display configured to visually augment an appearance of a physical space to a user viewing the physical space through the see-through display;
    a virtual reality engine configured to cause the see-through display to visually present a virtual monitor that appears to be integrated with the physical space at a particular physical-space location to the user viewing the physical space through the see-through display, the particular physical-space location mapped to a shared virtual coordinate system useable by other see-through displays to visually present the virtual monitor at the particular physical-space location; and wherein
    the virtual reality engine is further configured to play a video stream on the virtual monitor, and further configured to present the virtual monitor as a moving virtual monitor, the moving virtual monitor shaped to match a non-planar shape of an object moving within the physical space, and rendered so as to move relative to real-world objects within the physical space as perceived by the user viewing the physical space through the see-through display.

2. The head-mounted display of claim 1, further comprising a speaker, and where the virtual reality engine is further configured to cause the speaker to play an audio stream synced to the video stream.

3. The head-mounted display of claim 2, where the virtual reality engine is further configured to modulate a volume of the audio stream inversely proportional to a distance between the see-through display and a physical-space location at which the virtual monitor appears to be located to the user viewing the physical space through the see-through display.

4. The head-mounted display of claim 2, where the virtual reality engine is further configured to modulate a volume of the audio stream in proportion to a directness that the see-through display is viewing a physical-space location at which the virtual monitor appears to be located to the user viewing the physical space through the see-through display.

5. The head-mounted display of claim 1, further comprising a communication subsystem configured to wirelessly receive the video stream.

6. The head-mounted display of claim 1, where the virtual reality engine is further configured to present the virtual monitor with a specific orientation in the physical space, such that the user viewing the physical space through the see-through display perceives images displayed on the virtual monitor based on a location and orientation of the user in the physical space relative to a location and orientation of the virtual monitor in the physical space.

7. The head-mounted display of claim 1, further comprising a sensor subsystem, where the virtual reality engine is configured to control the virtual monitor responsive to commands recognized via the sensor subsystem.

8. The head-mounted display of claim 7, where the sensor subsystem includes a microphone, and where the virtual reality engine is configured to control the virtual monitor responsive to audible commands recognized via the microphone.

9. The head-mounted display of claim 7, where the sensor subsystem includes a camera, and where the virtual reality engine is configured to control the virtual monitor responsive to hand gesture commands recognized via the camera.

10. The head-mounted display of claim 9, wherein a single virtual monitor is split into two virtual monitors responsive to detection of a karate chop gesture performed by the user.

11. The head-mounted display of claim 7, where the sensor subsystem includes a camera, and where the virtual reality engine is configured to control the virtual monitor responsive to eye gesture commands recognized via the camera.

12. The head-mounted display of claim 1, where the virtual monitor displays three-dimensional virtual objects by visually presenting different views to a left eye and a right eye of the user.

13. The head mounted display of claim 1, wherein the moving virtual monitor is not constrained to a stationary real-world object.

14. The head mounted display of claim 1, wherein the moving virtual monitor is constrained to move within boundaries of a moving real-world object.

15. The head-mounted display of claim 1, wherein the moving virtual monitor is rendered to move within the physical space responsive to movement of the user within the physical space, so as to appear to be at a fixed distance and orientation relative to the user.

16. A method of augmenting reality, the method comprising:
   receiving observation information of a physical space from a sensor subsystem;
   mapping a virtual reality environment to the physical space based on the observation information, the virtual reality environment including a virtual monitor visually presenting a video stream, the virtual monitor shaped to match a non-planar shape of an object moving within the physical space; and
   sending augmented reality display information to a see-through display, the augmented reality display information configured to cause the see-through display to display the virtual reality environment mapped to the physical space so that a user viewing the physical space through the see-through display sees the virtual monitor integrated with the physical space, and such that two or more users viewing the physical space through different see-through displays will see the same virtual monitor in a same physical-space location and with the same orientation.

17. The method of claim 16, further comprising sending augmented reality audio information to a speaker, the augmented reality audio information configured to cause the speaker to play an audio stream synced to the video stream.

18. The method of claim 16, wherein the virtual monitor is shaped to match a non-planar shape of another virtual object.

19. A data-holding device holding memory instructions executable by a logic subsystem to:
   receive observation information of a physical space from a sensor subsystem;
   map a virtual reality environment to the physical space based on the observation information, the virtual reality environment including a virtual monitor visually presenting dynamic display information; and
   send augmented reality display information to a see-through display, the augmented reality display information configured to cause the see-through display to display the virtual reality environment mapped to the physical space so that a user viewing the physical space through the see-through display perceives the virtual monitor as a moving virtual monitor, the moving virtual monitor shaped to match a non-planar shape of an object moving within the physical space, and rendered so as to move relative to real-world objects within the physical space as perceived by the user viewing the physical space through the see-through display.

20. The data-holding device of claim 19, further holding instructions executable by a logic sub system to:
   present the virtual monitor such that the virtual monitor moves relative to real world objects in the physical space unconstrained by a surface of a real world object.

* * * * *